Patented Aug. 7, 1951

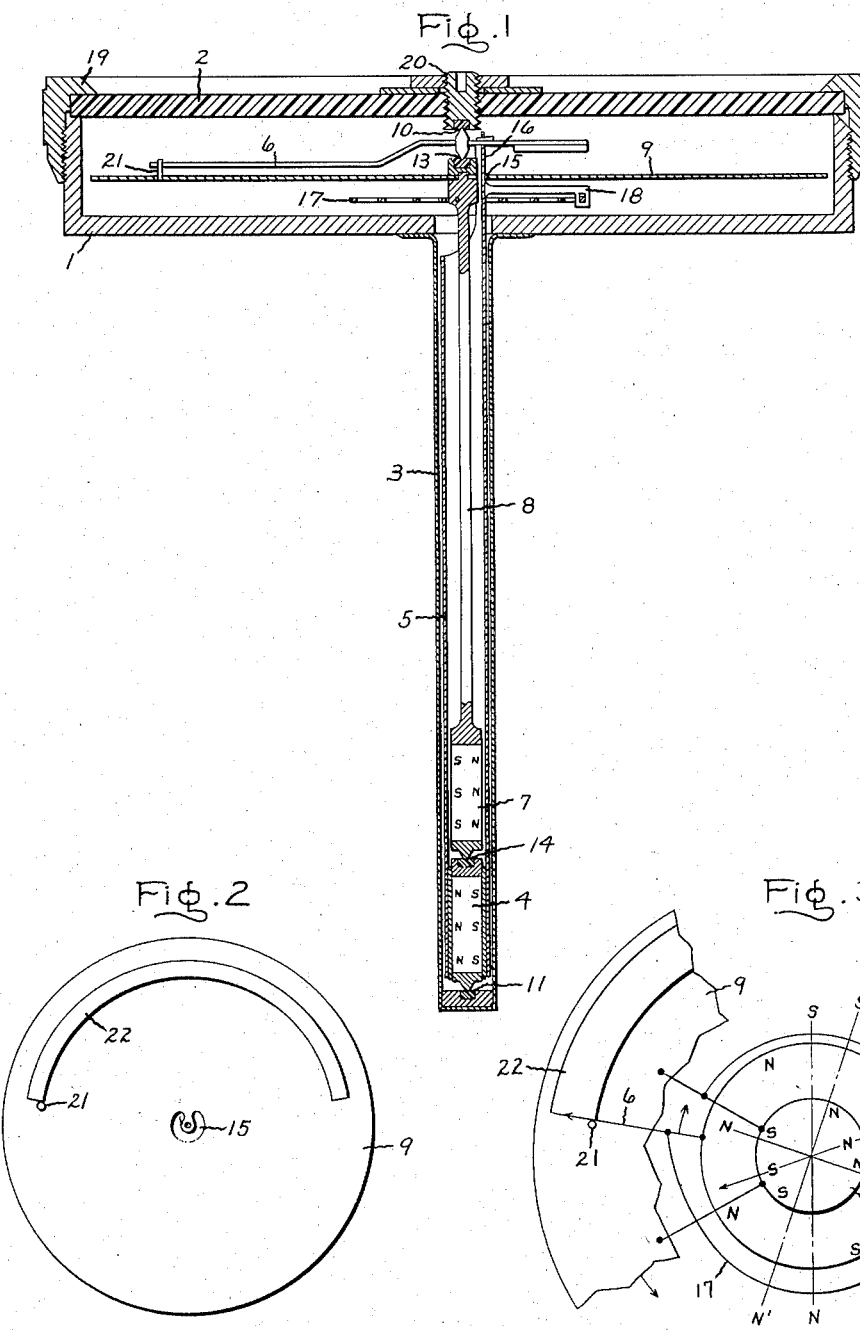

2,563,568

UNITED STATES PATENT OFFICE 2,563,568

FLUXMETER

Henry W. Wallace, Ballston Lake, N. Y., assignor to General Electric Company, a corporation of New York Application November 21, 1950, Serial No. 196,881

4 Claims. (Cl. 175—183)

My invention relates to fluxmeters and its object is to provide a small, lightweight, portable fluxmeter having a pointer and a cooperating scale, both of which are rotatable relative to the supporting casing and which, in a measuring operation, are rotated in opposite directions against a restraining spring by separate permanent magnets which attempt to align their flux axes with the field being measured.

The features of my invention which are believed to be novel and patentable will be pointed out in the claims appended hereto. For a better understanding of my invention, reference is made in the following description to the accompanying drawing in which Fig. 1 shows a cross-sectional view of a fluxmeter embodying my invention, and Fig. 2 the nature of the scale plate employed in Fig. 1. Fig. 3 is a schematic representation of the rotary parts of the instrument which will be described.

The instrument is contained in a dust-tight casing of nonmagnetic material having the enlarged circular upper head portion 1 and transparent window 2 closing its top and elongated axially extending tubular portion 3 which, when the instrument is used, is inserted into the flux field to be measured. The casing contains and supports two rotary systems or assemblies on the same axis of rotation concentric with the tubular part 3 and enlarged circular head part 1. One such assembly consists of a lower cylindrical permanent magnet 4 secured in the lower end of a tubular carrier 5 which is open and cut away at its upper end and which carries the pointer 6 at such upper end. The other rotatively mounted assembly consists of a second cylindrical permanent magnet 7, a shaft 8, and a scale plate 9 secured on the upper end of shaft 8. The assembly consisting of parts 4, 5, and 6 is pivoted at top and bottom by rotary pivots and stationary jewels at 10 and 11. And the other assembly consisting of parts 7, 8, and 9 is pivoted between the magnet 4 and pointer 6 by pivots and jewels at 13 and 14. The scale plate 9 has an arc-shaped opening 15 as best shown in Fig. 2 through which the reduced side wall portion 16 of tubular support 5 extends to bring the pointer 6 on support 5 above the scale plate 9 and permit relative rotation of the two pivoted assemblies through an angle of about 180 degrees. The rotary assemblies are balanced about the axis of rotation. Below the scale plate 9 resilient means such as a spiral spring 17 is connected between the two pivoted assemblies, the inner end being secured to shaft 8 and the outer end being secured to 16 by a radial arm 18. The casing has a top cover rim 19 which is removable with the glass window 2 so that the pivoted parts may be assembled and adjusted in their proper relation and then inserted into the casing. A final adjustment of the stationary jewel pivot at 10 is provided for by a jewel screw 20 threaded through the center of the glass window 2. The scale plate 9 preferably carries a stop pin 21 which is engaged by pointer 6 when the latter is at the zero end of its scale 22, the pointer being on the scale side of the stop so that it can move upscale. This stop prevents relative rotation of the systems through a zero scale and pointer indicating condition. It may be dispensed with and the end surfaces of slot 15 and shaft part 16 may serve as a stop. The spiral spring 17 is adjusted so that the two rotary assemblies will have this zero scale relation of pointer and scale when no external field is present to influence the permanent magnets 4 and 7. The permanent magnets are preferably similar and of equal strength and are polarized across their diameters at right angles to their axes of rotation as represented by the polarity marks thereon in Fig. 1 and in Fig. 3. The magnets are located closely adjacent to each other along the axis of rotation. At zero indication of the instrument the permanent magnets have their like polarized axes at an angle of nearly 180 degrees to each other, for example, 160 degrees.

Fig. 3 is a schematic representation of the magnets and indicating parts secured thereto, lower magnet 4 being shown larger than magnet 7 for better illustration purposes. If the parts are adjusted and the magnets polarized as shown when no magnetic field is present, and then the probe tube 3 of the device inserted into a magnetic field to be measured, such as that represented by the vertical line S—N, the magnets will try to align their magnetic axes with such field. Thus, magnet 7 will turn counterclockwise carrying scale plate 9 with it, and magnet 4 will turn clockwise carrying pointer 6 with it to produce an upscale indication of pointer 6 on scale 22. This action will be restrained by the spiral spring 17 until the turning torque of the magnets balances the spring restraining torque. The resulting scale indication will be a measure of the measurement field component which is at right angles to the instrument axis of rotation in the region occupied by the magnets.

The direction axis of the measurement field, if not known, may be ascertained by varying the direction of the probe until the maximum deflection is obtained, because maximum torque will occur for a given strength of field when the measurement field axis is at right angles to the instrument axis of rotation. The relation of the rotary instrument parts to the direction of the field to be measured is that represented in Fig. 3 for correct measurement purposes and after the device has been calibrated in known fields in this relation and the scale marked accordingly, the instrument is ready for use. If it should happen that upon inserting the probe into a field to be measured, the measurement field axis should be at a different angle than that shown in Fig. 3 relative to the rotary parts, for example, on line S'—N', the rotary parts will nevertheless adjust themselves to the correct angle by a corresponding bodily rotative movement clockwise and at the same time taking up the correct measurement deflection because the two rotary assemblies are freely rotary as a body about the axis of rotation and because the conditions of equal torque for each of the rotary assemblies are when the major flux axes of their magnets represented by arrows X and Y are at equal angles to the measurement field. The difference between the deflections will be proportional to the measurement field strength. The maximum possible deflection will be 160 degrees for the angle of 160 degrees assumed between the zero position flux axes of the two magnets. The flux strength measurement range will depend primarily on the strength of the spring. The reason for making the angle between magnet flux axes less than 180 degrees for the zero indicating condition is to prevent the possibility of a dead-center magnetic torque condition at any point of the deflection range including zero deflection.

When there is no measurement magnetic field, the axial proximity of the two magnets 4 and 7 and the angular proximity of their poles of unlike polarity for the zero deflection condition represented in Fig. 3 may cause a small magnetic torque between the two magnets which tends to rotate unlike poles towards each other. This tends to keep pointer 6 against stop 21 independently of any bias due to spring 17. Such magnetic torque that may exist between the two magnets is taken into account in the adjustment of the spring 17 and calibration of the instrument.

The size of the magnets and other parts will depend somewhat upon the intended use. For general purpose use the magnets 4 and 7 may be 1/8 inch in diameter and other instrument dimensions about in the relation represented in Fig. 1. A high coercive force permanent magnet material should be used such, for example, as an alloy of from 17 to 23 per cent cobalt and the remainder platinum, or the silver, manganese aluminum alloy described in United States Patents Nos. 2,399,031 and 2,399,032. The permanent magnets should be well stabilized prior to calibration and use of the instrument.

I prefer to use cylindrical magnets rather than bar magnets at 4 and 7 because the former will produce a more open scale and require less lateral space in the probe. The outside of the probe shell 3 may be painted a distinctive color over the area inclosing the permanent magnets to aid the user in correctly axially locating the probe in an air gap or the like where the field strength is to be measured.

What I claim as new and desire to secure by Letters Patent of the United States is:

1. A fluxmeter comprising a supporting casing and two rotary systems pivoted on the same axis of rotation within said casing, said systems being rotatable with respect to said casing and to each other, each system including a permanent magnet polarized at right angles to the axis of rotation, said magnets being located closely adjacent each other along said axis of rotation, resilient means connected between said two systems, a scale secured to one system and a pointer reading on said scale secured to the other system, said resilient means tending rotatively to bias said systems to a condition where the pointer is at a zero indicating position relative to the scale, and the angle between like polarized axes of said magnets is nearly 180 degrees such that relative rotation of the systems to reduce such angle moves the pointer upscale and tensions said resilient means.

2. A fluxmeter comprising a supporting casing and two rotary systems pivoted on the same axis of rotation within said casing, said systems being rotatable with respect to said casing and to each other, each system including a permanent magnet polarized at right angles to the axis of rotation, said magnets being located closely adjacent each other along said axis of rotation, a spiral spring connected between said two systems, a scale secured to one system and a pointer reading on said scale secured to the other system, said spiral spring tending rotatively to bias said systems to a condition where the pointer is at a zero indicating position relative to the scale, and the angle between like polarized axes of said magnets is nearly 180 degrees such that relative rotation of the systems to reduce such angle moves the pointer upscale and tensions said spring, and stop means for preventing relative rotation of said members through a zero scale and pointer indicating condition.

3. A fluxmeter comprising a supporting casing, a pair of rotary systems within said casing, said systems being rotatable with respect to said casing and to each other on the same axis of rotation, each system including a cylindrical-shaped permanent magnet concentric with the axis of rotation, said magnets being located end to end closely adjacent each other along the axis of rotation, said permanent magnets being polarized at right angles to the axis of rotation, a scale secured to one system and a pointer secured to the other system and indicating on said scale, a spiral spring secured between said systems, said parts being assembled and said spring adjusted to produce a zero scale and pointer indicating condition when there is an angle of nearly 180 degrees between like polarized axes of the permanent magnets such that when the magnets of said meter are influenced by an external magnet field at right angles to its axis of rotation, the magnets attempt to turn and align their polarized axis with such field and produce an upscale deflection against the restraining action of said spring in proportion to the strength of such external field.

4. A fluxmeter comprising a dust-tight casing having an enlarged diameter circular head portion and a reduced diameter tubular probe portion extending axially from the bottom of said head portion, a removable transparent window cover forming the top of said head portion, a pair of rotary systems within said casing pivoted on a common axis of rotation concentric with said circular head and tubular probe casing parts, one system comprising a first permanent magnet located in the lower end of said probe casing portion and a pointer located in said head casing portion and connected together by a hollow tubular holder and pivoted at either end at the bottom of said probe portion and at said cover portion, the other system comprising a second permanent magnet located closely adjacent and above the first permanent magnet in said probe portion and a scale plate located in said head portion below the pointer and connected together by a shaft within said tubular holder and pivoted at top and bottom between said first magnet and said pointer, said scale plate having an arc-shaped opening and the upper end of said tubular holder being cut away except on one side so as to extend through said arc-shaped opening and permit relative rotation of said systems over the intended deflection range, said permanent magnets being similar and being polarized at right angles to the axis of rotation, a spiral spring connected between said systems, a scale on said scale plate on which said pointer indicates, said scale and pointer being visible through said transparent window, said parts being assembled and said spring being adjusted such that when the magnets are not influenced by an external field, the pointer indicates zero on the scale and the angle betwen the like polarized axes of the magnets is of the order of 170 degrees and will decrease with upscale indicating conditions.

HENRY W. WALLACE.

REFERENCES CITED

The following references are of record in the file of this patent:

UNITED STATES PATENTS

| Number | Name | Date |
|---|---|---|
| 1,701,603 | Bauer et al. | Feb. 12, 1929 |
| 2,461,864 | Zuschlag | Feb. 15, 1949 |